United States Patent [19]

Potter

[11] 4,375,976

[45] Mar. 8, 1983

[54] METHOD AND APPARATUS FOR RECOVERING PARTICULATE MATTER FROM GAS STREAM

[76] Inventor: George R. Potter, 784 Beaver Creek Rd., Coos Bay, Oreg. 97470

[21] Appl. No.: 239,004

[22] Filed: Feb. 27, 1981

[51] Int. Cl.³ ............... B01D 47/06; B01D 47/12; B01D 1/20

[52] U.S. Cl. .................................. 55/85; 55/89; 55/92; 55/94; 55/223; 55/228; 55/238; 55/242; 55/258; 55/259; 55/96; 261/3; 261/5; 261/79 A; 159/4 A; 159/4 ST

[58] Field of Search ............. 55/85, 89, 92, 94, 223, 55/228, 233, 238, 242, 258-260, 96, 22; 261/3-6, 79 A; 210/391; 34/57 R; 159/4 A, 4 ST

[56] References Cited

U.S. PATENT DOCUMENTS

| | | | |
|---|---|---|---|
| 2,746,564 | 5/1956 | Williams | 55/22 |
| 3,064,408 | 11/1962 | Erga et al. | 55/94 |
| 3,268,296 | 8/1966 | Hall et al. | 55/94 |
| 3,353,799 | 11/1967 | Lions et al. | 55/228 |
| 3,624,984 | 12/1971 | Ferrari et al. | 55/85 |
| 3,856,487 | 12/1974 | Perez | 55/223 |
| 3,894,853 | 7/1975 | Pike | 55/258 |
| 3,954,613 | 5/1976 | Worlidge | 210/391 |
| 3,972,817 | 8/1976 | Moe | 210/391 |
| 3,984,217 | 10/1976 | Huntington | 55/228 |
| 4,153,432 | 5/1979 | Beman et al. | 55/242 |

FOREIGN PATENT DOCUMENTS

| | | | |
|---|---|---|---|
| 1571765 | 12/1972 | Fed. Rep. of Germany | 55/96 |
| 1290363 | 9/1972 | United Kingdom | 55/233 |

Primary Examiner—David L. Lacey
Attorney, Agent, or Firm—Chernoff & Vilhauer

[57] ABSTRACT

Filter apparatus and a method for removing dry combustible particulate material from a stream of gas in two steps of separation, utilizing a primary separator to remove the majority of the material from said stream of gas and a secondary filter apparatus which includes water sprays and a wetted filter pad to remove additional material. Portions of the filter pad are sequentially backwashed at periodic intervals, and the particulate material washed from the filter pad is thereafter introduced into the stream of gas being cleaned, permitting collection of all removed particulate material from a single collection point associated with the primary separation apparatus. The material washed from the filter pad of the secondary apparatus is introduced into the stream of gas to be cleaned in the form of a slurry, the moisture from the slurry thereby reducing the likelihood of explosion of the particulate matter within the stream of gas.

10 Claims, 1 Drawing Figure

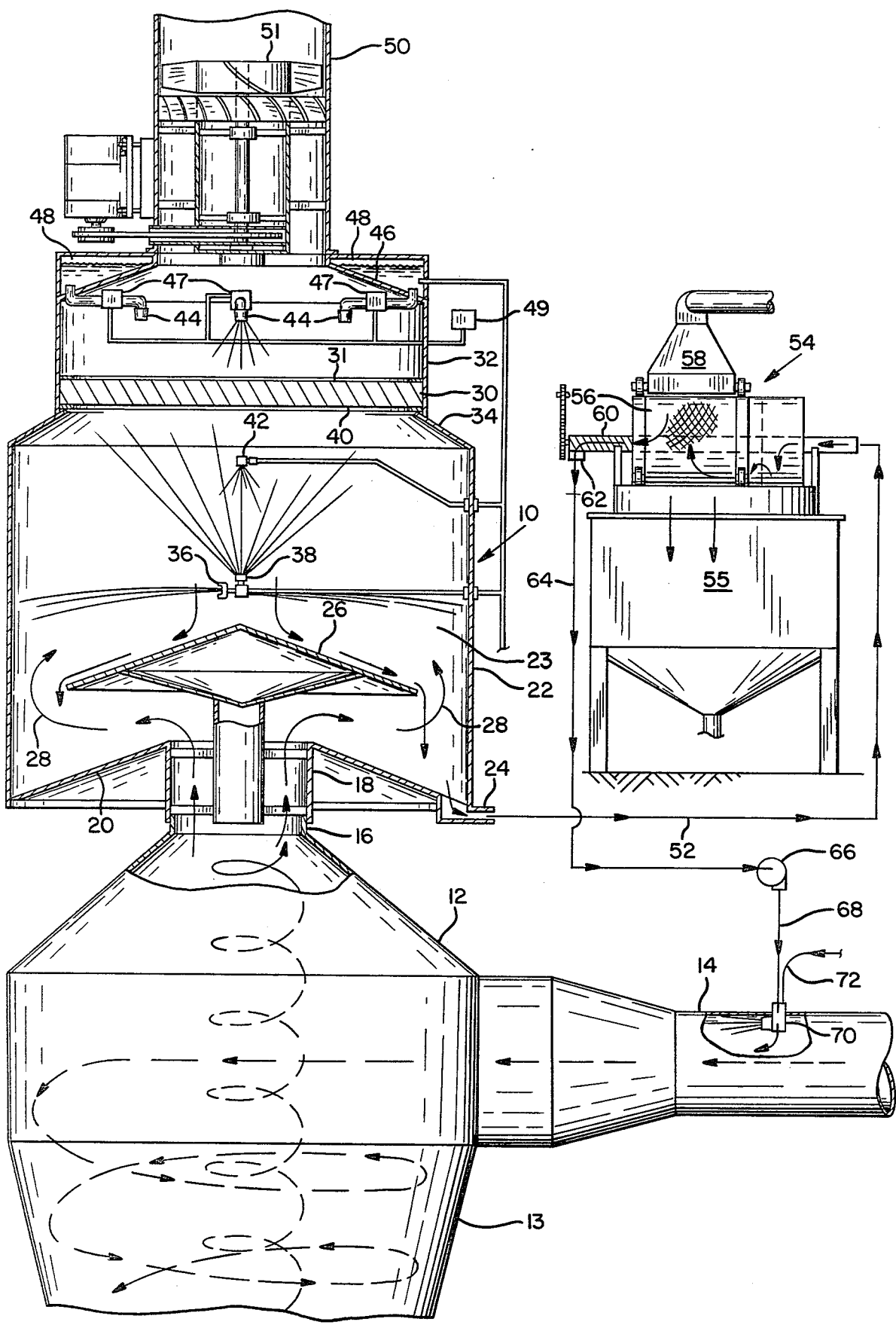

METHOD AND APPARATUS FOR RECOVERING PARTICULATE MATTER FROM GAS STREAM

BACKGROUND OF THE INVENTION

The present invention relates to a method and apparatus for cleaning a stream of gas, and particularly for removing dry particulate matter from a stream of gas.

Maintenance of air purity is a significant problem in many industries in which dust is necessarily produced during manufacture of products. For example, sawdust and sander dust are produced in great quantities in the wood products industry, and dust is inevitably produced during handling of grain products.

In many cases the dust removed from a stream of gas is of commercial value. For example, the wood dust resulting from sander or sawmill operation is usable as furnace fuel or as a component of particle board and similar composition material. Similarly, much of the dust produced during handling of grain contains nutrients usable as animal feed, if not for human consumption. It is therefore desirable to retain these materials, rather than discard them.

Many methods and types of apparatus have been developed to filter particulates and other suspended matter from streams of gas. Known methods, however, present some significant drawbacks. For example, cyclone separators are commonly used to remove the bulk of dry particulate material from a stream of gas. The amount of such dust which can be removed from the air by a primary separator such as a cyclone separator, however, is frequently insufficient, and a secondary separator must be used to remove additional lighter or smaller particles from the stream of air. In known apparatus, the matter collected in the secondary cleaning apparatus frequently must be handled separately from that collected in the primary apparatus. This is particularly true when secondary cleaning apparatus involves the use of liquid sprays to remove particulates from suspension.

The particulate matter collected in a wet secondary filter must ordinarily be separated from at least a large part of the liquid, to conserve the liquid and facilitate handling. Unless substantially all moisture has been removed such material has previously needed to be handled separately, requiring extra labor and causing inconvenience.

Apparatus used to transport light and fine particulate materials is typically subject to damage from invasion of the particles into bearings and motor cases. It is therefore desirable not to handle this material separately.

When particulate solid materials have been removed from the air by exposure to a liquid spray they have previously required additional handling, because the particulate matter is dispersed in a relatively large quantity of liquid. Introduction of a small amount of particulate matter, along with a large amount of liquid, into the large quantity of dry particulate matter separated from a stream of gas in a primary separator is unsatisfactory because it would add unacceptable amounts of moisture to dry material such as sander dust removed from a stream of gas, making it susceptible to spoilage and difficult to handle, or worthless for later use.

Some types of combustible dry material, such as fine sander dust, grain dust, and similar materials, form explosive mixtures with air and are thus potentially dangerous to handle. It is well known that grain elevators and flour mills are too frequently the sites of dangerous explosive fires, and a similar hazard is presented by very dry sawdust.

Multi-stage apparatus for removing dry particulate material from a stream of gas is shown in McGregor et al, U.S. Pat. No. 3,203,156, and apparatus for removing suspended wet particles from a stream of air is shown in Skoli et al, U.S. Pat. No. 3,771,289. Selmeczi, U.S. Pat. No. 3,914,378, and Hall et al, U.S. Pat. No. 3,268,296 both disclose gas scrubbers incorporating sprays impinging on both sides of a filter element, but no provision is made for periodic backwashing of the filter element. Furthermore, none of these patents provides for continuous collection of all material separated from a stream of gas at a single point.

What is needed, then, is a method and apparatus for providing primary and secondary removal of dry particulate matter from a stream of gas and making a maximum amount of commercially valuable particulate matter so recovered available at a single point of collection. It is also desirable to reduce the risk of explosion caused by presence of such dry combustible particulate matter in a stream of air.

SUMMARY OF THE INVENTION

The present invention overcomes the shortcomings of previously known air filtration systems for use in removing dry combustible particulate matter from a stream of gas by providing a multiple stage filtration system and a method for removing particulate matter from a stream of air in at least two stages of filtration. In addition, the invention permits collection of substantially all of the material filtered from the stream of gas at a single point, while also reducing the risk of explosion of an otherwise combustible mixture of particulate matter in air.

According to the present invention a primary separator such as a vortex or cyclone separator is used to remove the bulk of the particulate material from a stream of gas without adding any moisture to the material. The exhaust from the cyclone separator, typically directed upwardly, is conducted into the bottom of a secondary separator comprising a generally cylindrical filter and scrubber apparatus. In the secondary separator the remaining particulate matter is filtered from the stream of gas exhausted from the primary separator, by a combination of sprays of water or other liquid which wet some of the particles, and by impingement of the particles on the surfaces of a filter pad which is maintained in a wet condition by the liquid sprays.

Such a filter pad may, for example, consist of multiple layers of a fabric through which the stream of gas passes. The single stream of gas is subdivided by each layer of fabric into many smaller streams which are forced to follow tortuous paths through the filter pad, repeatedly impinging on the wetted surfaces of the multiple layers of filter fabric.

The filter pad is periodically cleansed by application of ample amounts of a liquid such as water to the exhaust side of the filter pad. Preferably the filter pad is horizontally oriented, allowing the liquid applied to the exhaust side to drain downward through the filter pad, washing accumulated particulate matter from the surfaces of the several layers of filter pad fabric back toward the interior of the secondary filter apparatus. Only a portion of the filter pad is backwashed at any one time, permitting continuous operation of the filter apparatus during cleansing of the filter pad.

The combined spray liquid and backwash liquid, along with the entrained particulate matter removed from the filter pad surfaces, is conducted via a drain located at the bottom of the secondary filter apparatus to a screen apparatus, for example a rotating drum screen apparatus which removes the wetted particulate matter from the stream of liquid as a slurry containing, for example, 50% water and 50% particulate matter.

The slurry is thereafter reintroduced into and mixed with the bulk of the dry particulate matter collected by the primary separator. This is preferably accomplished by introducing the slurry into the main stream of dirty gas which is being cleaned, using an air driven atomizing nozzle to disperse the slurry as a fine spray into the stream of dirty gas before it enters the primary separator. This provides the advantage of adding moisture into the stream of dirty gas, thereby reducing the likelihood of explosion of combustible particulate matter.

It is therefore a primary objective of the present invention to provide an improved method and apparatus for removing dry particulate matter from a stream of gas.

It is another objective of the present invention to provide a method and apparatus for recovering increased amounts of commercially valuable dry particulate matter from a stream of gas in a form permitting storage or use.

It is another objective of the present invention to reduce the risk of explosive combustion of particulate matter suspended in a stream of gas or accumulating in a collection system.

It is a principal feature of the present invention that it provides an improved device for collecting extremely small dry particles of solid material from a stream of gas and mixing such material into the bulk of dry particulate matter being accumulated.

It is another feature of the present invention that it provides a method for reducing the risk of explosion of finely divided combustible particulate matter while increasing the amount of particulate matter collected from a stream of air.

It is yet a further feature of the present invention that it provides a secondary filter apparatus which may be operated continuously and yet may be periodically cleaned during operation.

It is a primary advantage of the present invention that it permits increased efficiency of collection of dry particulate matter.

It is another important advantage of the present invention that it permits collection of substantially all particulate matter removed from a stream of gas at a single collection point, without the necessity for complex dry material handling systems.

It is yet a further advantage of the present invention that it provides reduced risk of explosion of dry particulate matter suspended in a stream of air.

The foregoing and other objectives, features, and advantages of the invention will be more readily understood upon consideration of the following detailed description of the invention, taken in conjunction with the accompanying drawings.

BRIEF DESCRIPTION OF THE DRAWING

The FIGURE is a sectional view of apparatus incorporating the present invention, in which a wet filter is associated with a cyclone separator, with the path of material rinsed from the wet filter shown schematically.

DETAILED DESCRIPTION OF THE INVENTION

Referring now to the drawing, exemplary apparatus embodying the invention includes a secondary separator such as filter apparatus 10 exemplarily located directly atop a primary separator such as a vortex or cyclone separator 12 of the well known type including a conical lower portion 13. An infeed conduit 14 for a stream of particle-laden gas is interconnected with the cyclone separator 12, providing a tangential entry flow of the dust-laden gas into the cyclone separator 12. The infeed conduit 14 may, for example, lead from the sanding machines of a plywood mill.

The cyclone separator 12 provides an inwardly and downwardly spiralling flow of the entering air, permitting much of the dust carried by the stream of air to settle in the bottom portion 13 of the cyclone separator 12 in the well known fashion. Relatively clean air flows upwardly along the central vertical axis of the cyclone separator 12, exiting through an upwardly directed exhaust trunk 16.

Communicating with the exhaust trunk 16 is the inlet trunk 18 of the secondary filter apparatus 10. Although the secondary filter apparatus 10 is shown mounted directly atop the cyclone separator 12, it will be readily apparent that it might also be placed some distance therefrom, with appropriate conduits interconnecting the exhaust trunk 16 and the inlet trunk 18. The inlet trunk 18 is downwardly open and extends upwardly through the central portion of an upwardly convex frusto-conical floor 20 of the secondary filter apparatus 10. A vertical generally cylindrical side wall 22 extends upwardly from the floor 20, defining a lower chamber 23, and a drain outlet 24 is provided at a point along the intersection between the floor 20 and the side wall 22.

A baffle 26 located above the inlet trunk 18 is an upwardly pointed cone supported appropriately to permit a stream of gas entering the secondary filter apparatus 10 from the cyclone separator 12 to follow the path indicated by the arrows 28 through the inlet trunk 18 beneath the baffle 26 and upward around the edges of the baffle 26. The diameter of the baffle 26 is greater than that of the inlet trunk 18, and preferably the baffle 26 is located concentric with the floor 20 and the inlet trunk 18.

In the case of the secondary filter 10 being located remote from the cyclone separator 12, the inlet trunk 18 could enter horizontally through the side wall 22. In that case the baffle 26 is made unnecessary, and the floor could slope downward to a centrally located drain.

Spaced an appropriate distance, for example about five feet, above the baffle 26 is a filter pad 30, preferably circular in shape and of a somewhat smaller diameter than the floor 20 and side wall 22 of the secondary filter apparatus. The filter pad 30 extends generally horizontally across a slightly reduced diameter portion of the secondary filter apparatus 10 defined by an upper side wall 32 which is connected to the side wall 22 preferably by a frustoconical wall 34.

The filter pad 30 is of a generally permeable construction providing only a small amount of resistance to the flow of a large volume stream of gas. Preferably the filter pad 30 is a number of layers of permeable fabric stacked upon one another to a thickness sufficient for the amount of filtration required. For example, such a fabric may be knitted and crimped stainless steel wire with a coarse fabric used at the bottom and relatively finer fabrics being used in layers closer to the top or exit side 31, forming a multi-density filter pad with a total thickness of six inches. Such a filter pad is commercially available as a scrubber for removal of liquid droplets from a stream of gas, under the trademark "Demister", from the Otto H. York Company of Parsippany, New Jersey, with the coarseness or fineness of the fabric optional, depending upon the sizes of particles it is desired to remove from the air.

Located centrally within the chamber 23, between the filter pad 30 and the baffle 26, and spaced a short distance above the baffle 26, are spray nozzles 36 and 38. Spray nozzle 36 is arranged to provide a generally horizontal radial spray of water or other liquid toward the side wall 22, through which the upwardly moving stream of air must pass. This horizontal spray is used to moisten the particulate matter remaining in the stream of air as it proceeds upwardly from the cyclone separator 12.

The spray 38 is an upwardly directed conical spray appropriately positioned to keep the underside 40 of the filter pad 30 moist. Since the stream of air proceeding upwardly through the secondary filter apparatus must also pass through this spray, the particulate matter carried in the stream is again exposed to being wetted by the spray 38.

Located above the spray 38, yet still below the underside 40 of the filter pad 30, is a downwardly directed conical spray 42 which provides a third opportunity for moistening of particulate matter carried in the stream of air through the secondary filter apparatus 10. Additionally, the spray 42 rinses the upper surface of the conical baffle 26.

Located above the filter pad 30 are a plurality of backwash nozzles 44, preferably four in number, which are spaced around a top 46 of the secondary filter apparatus 10. Each of the backwash nozzles 44 is directed toward a different quadrant of the filter pad 30. Preferably the backwash nozzles 44 are of large enough capacity to provide a very heavy coarse spray of water directed downwardly on approximately one-fourth of the filter pad 30 to flush away any particulate matter adhering to the surfaces of the filter pad fabric. For example, in a secondary filter apparatus 10 having a filter pad 30, 9 feet, 6 inches, in diameter, such a backwash nozzle 44 would have a capacity of 80 gallons of water per minute. A suitable nozzle is manufactured by Spraco, Inc. of Nashua, New Hampshire, under Part No. 36631732. Suitable piping and valves 47, preferably remotely controllable, are used to provide water to backwash a single quadrant of the filter pad at a time using water stored in a reservoir 48, which surrounds an upper portion of the filter apparatus 10, providing sufficient pressure for proper distribution of the backwash. It has been found that a backwash lasting about $2\frac{1}{2}$ minutes is ample for cleaning a six inch thick multi-density filter pad in a secondary filter apparatus 10 used with a cyclone separator 12 to clean sander dust from a stream of air. Preferably a sequencing timer switch 49 is used to control the valves 47.

Extending upwardly above the top 46 of the secondary filter apparatus 10 is an air discharge trunk 50. Within the air discharge trunk 50 is an axial flow fan 51 used to compensate for the pressure drop occurring within the cyclone separator 12 and secondary filter apparatus 10.

A conduit 52, shown schematically, extends from the drain 24 to a screen apparatus 54 mounted atop a clarifier tank 55. The screen apparatus 54 includes a cylindrical screen 56, which is oriented with its central axis horizontal and which is rotated about its central axis during operation. The cylindrical screen 56 may, for example comprise a No. 100 mesh stainless steel screen supported by suitable grid structure. A blower nozzle 58 is positioned above the cylindrical screen 56, while an auger conveyor 60 extends within the cylindrical screen, along its central axis, and is upwardly open beneath the blower nozzle 58. The discharge end 62 of the auger conveyor 60 is located outside the cylindrical screen 56 and is connected to a conduit 64. The conduit 64 extends to the inlet side of a pump 66 from which a discharge conduit 68 extends to a nozzle 70 located in the infeed conduit 14.

The nozzle 70 may preferably be an atomizer nozzle of a type having a small dish- or cup-like receptacle into which the slurry is introduced through a conduit. A stream of compressed gas is directed toward the interior of the receptacle to atomize the slurry, and for the purpose, a compressed air conduit 72 also leads to the nozzle 70. Nozzles of this type are well known for use for atomizing oil for combustion. Any atomizing nozzle of this general type is satisfactory so long as it has a large enough conduit to prevent clogging by the slurry.

In performing the method of the present invention for recovering particulate matter from a stream of gas, the stream of gas is introduced into the primary cleaner, such as the cyclone separator 12, through the infeed conduit 14, and primary separation of particulate matter from the stream of gas is effected in the cyclone separator 12. Material separated from the stream of gas within the cyclone separator 12 is deposited in the lower portion 13 of the cyclone separator where it may be removed periodically through a rotary valve (not shown), or other suitable apparatus.

The primarily cleaned stream of gas then proceeds upwardly through the cyclone separator exhaust trunk 16 and the secondary filter apparatus inlet trunk 18. The stream of gas is forced to proceed outwardly beyond the edges of the baffle plate 26 and thereafter flows upward, proceeding through the horizontal spray 36, which wets some of the matter remaining in the stream of gas. The gas proceeds further upward, passing through the upwardly directed conical spray 38 and the downwardly directed conical spray 42, thus being exposed a second and a third time to wetting by the sprays. The stream of gas then passes into the filter pad 30, whose bottom side 40 is maintained in a moist condition by the upwardly directed conical spray 38. Substantially all of the remaining particulate matter carried by the stream of gas is collected by impingement on and subsequent adhesion to the surfaces of the fabric of the filter pad 30. Substantially clean gas then proceeds further upward beyond the filter pad 30 through the clean gas discharge trunk 50, aided by the axial flow fan 51.

As continued deposition of particulate matter on the surfaces of the fabric of the filter pad 30 would obviously result in total clogging of the filter pad, the filter pad is periodically backwashed. One at a time, the sequencing timer switch 49 opens each valve 47 and provides a flow of water or other appropriate washing fluid from the reservoir 48, which is sprayed on a portion of the filter pad 30 by the associated one of the backwash nozzles 44, backwashing approximately one-fourth of the filter pad 30. The sequencing timer switch 49 then provides enough time for the reservoir 48 to be refilled before opening another one of the valves 47. Material washed from the surfaces of the filter pad 30 falls downward onto and around the baffle plate 26, and the downwardly directed conical spray 42 rinses the material which falls on the baffle plate 26 toward the bottom 20 of the secondary filter apparatus. Operation of the secondary filter apparatus 10 may continue unaffected during the backwashing of the filter pad 30.

The mixture of backwash water, water from the sprays 36, 38 and 42, and the entrained particulate matter which has been filtered from the stream of gas, proceeds outward through the drain 24 located at the bottom edge of the secondary filter apparatus 10. This water and entrained material is conducted through conduit 52 into the screen apparatus 54, where the rotating cylindrical screen 56 retains substantially all of the particulate matter, while a large quantity of the water proceeds outward through the screen. The screen 56 is rotated during its operation, carrying a layer of adhering particulate matter to a position beneath the blower nozzle 58. Air expelled through the blower nozzle 58 displaces the accumulated particulate matter from the screen 56, blowing it into the upwardly open auger conveyor 60. This material, in the form of a wet slurry, is then conducted through the discharge end of the auger 60, through the conduit 64, the pump 66 and the conduit 68, into the nozzle 70, which injects the wet slurry of collected particulate material as a spray into the stream of gas being cleaned.

The amount of slurry returned to the stream of gas being cleaned is normally no more than about 5% of the total flow of particulate material, which is a small enough amount of moisture to be added to the dry particulate material without causing problems. Because of the dry nature of the stream of gas being cleaned the moisture is readily evaporated, cooling the stream of gas. By increasing the moisture content of the material entrained in the gas, this introduction of the wet slurry reduces the likelihood of explosion of the particulate matter.

Being in a moist condition, the material reintroduced into the stream of gas to be cleaned is somewhat more dense than when it was first passed through the cyclone separator 12 and will be more likely to be contained within the cyclone separator 12 for collection at the bottom thereof along with other larger particles removed from the stream of gas.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A method of removing and collecting combustible particulate matter, in a substantially dry form, from a stream of gas containing said particulate matter, comprising:
   (a) passing said stream of gas through a dry primary separator;
   (b) collecting a majority of said particulate matter from said stream of gas in said primary separator;
   (c) thereafter conducting said stream of gas into a secondary separator;
   (d) collecting additional particulate matter from said stream of gas in said secondary separator;
   (e) washing said additional particulate matter from said secondary separator with a liquid and thereby forming a fluid mixture of said additional particulate matter and said liquid;
   (f) removing said fluid mixture from said secondary separator;
   (g) separating a minor portion of said liquid and a major portion of said additional particulate matter from said fluid mixture and forming a slurry thereof;
   (h) introducing said slurry into said stream of gas at a location upstream from entry of said stream of gas into said primary separator and thereby transferring liquid from said slurry to other particulate matter contained in said stream of gas; and
   (i) thereafter collecting said additional particulate matter of said slurry and said other particulate matter from said stream of gas.

2. The method of claim 1 including in step (d) the step of passing said stream of gas through a filter pad within said secondary separator, and including in step (e) the step of washing different portions of said filter pad individually at different times.

3. The method of claim 1, including in step (d) the step of passing said stream of gas upwardly through a spray of liquid and thereafter upwardly through a filter pad.

4. The method of claim 1 including in step (h) the step of dispersing said slurry into said stream of gas through a spray nozzle.

5. The method of claim 1, 2, 3, or 4 including, in step (g), passing said fluid mixture through a screen previous to the passage of said liquid but impervious to the passage of said major portion of said additional particulate matter.

6. The method of claim 1 including in step (h) introducing no more than about five percent of the total flow of particulate material into said stream of gas in the form of said slurry.

7. Apparatus for removing combustible particulate matter in a substantially dry form from a stream of gas, comprising:
   (a) dry primary separator means for removing a majority of said particulate matter from said stream of gas;
   (b) infeed conduit means for directing said stream of gas into said primary separator means;
   (c) secondary separator means for removing additional particulate matter from said stream of gas and having particulate collecting surfaces for collecting said additional particulate matter;
   (d) washing means in said secondary separator means for washing said additional particulate matter from the collecting surfaces of said secondary separator means with a liquid;
   (e) drain means in said secondary separator means for collecting said additional particulate matter and said liquid as a fluid mixture;
   (f) means connected to said drain means for separating a minor portion of said liquid and a major portion of said additional particulate matter from said fluid mixture and forming a slurry thereof;
   (g) means for delivering said slurry from said means for separating to said infeed conduit means; and (h) means located in said infeed conduit means for introducing said slurry into said infeed conduit means.

8. The apparatus of claim 7, wherein said collecting surfaces comprise filter pad means for removing said additional particulate matter from said stream of gas and said washing means comprises a plurality of nozzles, each directed toward different portions of said filter pad means, and means for sequentially directing said liquid through different ones of said plurality of nozzles.

9. The apparatus of claim 8 wherein said primary separator means includes a centrifugal separator, and wherein said secondary separator means is generally upright and includes gas inlet and outlet means located in the bottom and top thereof respectively for admitting said stream of gas upwardly into said secondary separator means from said primary separator means and conducting said stream of gas upwardly through said filter pad means.

10. The apparatus of claim 7, 8 or 9 wherein said means connected to said drain means comprises a screen pervious to the passage of said liquid but impervious to the passage of said major portion of said additional particulate matter.

* * * * *